United States Patent [19]

Berry et al.

[11] Patent Number: 4,808,317

[45] Date of Patent: Feb. 28, 1989

[54] PROCESS FOR CONTINUOUS CONTACTING OF FLUIDS AND SOLIDS

[75] Inventors: W. Wes Berry, Lakeland, Fla.; Rae A. Schmeda, Littleton; Holly S. Kibler, Boulder, both of Colo.

[73] Assignee: Advanced Separation Technologies Incorporated, St. Petersburg, Fla.

[21] Appl. No.: 36,502

[22] Filed: Apr. 9, 1987

Related U.S. Application Data

[60] Division of Ser. No. 713,492, Mar. 19, 1985, Pat. No. 4,764,276, which is a continuation-in-part of Ser. No. 635,837, Jul. 30, 1984, Pat. No. 4,522,726.

[51] Int. Cl.$^4$ ............................................. B01D 15/02
[52] U.S. Cl. .................... 210/660; 210/676; 210/784; 210/806; 55/78; 55/99
[58] Field of Search ............... 210/672, 806, 267, 264, 210/657, 660, 677, 780, 784, 790, 681; 55/78, 99, 181, 390, 474

[56] References Cited

U.S. PATENT DOCUMENTS

| | | | |
|---|---|---|---|
| 2,617,960 | 11/1952 | Miller | 210/267 |
| 2,639,000 | 5/1953 | Edwards | 210/404 |
| 2,877,861 | 3/1959 | Miller | 55/60 |
| 2,967,148 | 1/1961 | Karnofsky | 210/672 X |
| 2,985,589 | 5/1961 | Broughton et al. | 210/264 |
| 3,080,692 | 3/1963 | Staley et al. | 55/18 |
| 3,201,921 | 8/1965 | Heyes | 210/264 X |
| 3,231,492 | 1/1966 | Stine et al. | 210/676 |
| 3,504,483 | 4/1970 | Tamura et al. | 55/180 |
| 3,706,812 | 12/1972 | DeRosset et al. | 55/344 X |
| 3,971,842 | 7/1976 | Ewbank | 210/267X |
| 4,032,442 | 6/1977 | Peterson | 210/780 |
| 4,124,508 | 11/1978 | Capetanopoulas | 210/218 |
| 4,155,846 | 5/1979 | Novak et al. | 210/264 |
| 4,412,866 | 11/1983 | Schoenrock et al. | 210/656 X |
| 4,522,726 | 6/1985 | Berry et al. | 210/660 |

FOREIGN PATENT DOCUMENTS

| | | |
|---|---|---|
| 2260402 | 7/1974 | Fed. Rep. of Germany . |
| 1109174 | 1/1956 | France . |
| 1167826 | 12/1958 | France . |
| 48-43258 | 12/1973 | Japan . |
| 45709 | 3/1934 | U.S.S.R. . |
| 614811 | 6/1978 | U.S.S.R. . |
| 980255 | 1/1965 | United Kingdom . |

*Primary Examiner*—Tom Wyse
*Attorney, Agent, or Firm*—Burns, Doane, Swecker & Mathis

[57] ABSTRACT

A continuous contacting device is disclosed wherein a fluid stream may be contacted with particulate exchange materials. The device includes a plurality of rotating chambers filled with particulate material. Fluid is supplied individually to these chambers through a plurality feed ports which are in periodic fluid communicating relation with each of the chambers. A plurality of fixed discharge ports which are likewise in periodic fluid communicating relation with each of the chambers is also provided. A process for continuously contacting fluids with the solid particulates is also disclosed.

9 Claims, 6 Drawing Sheets

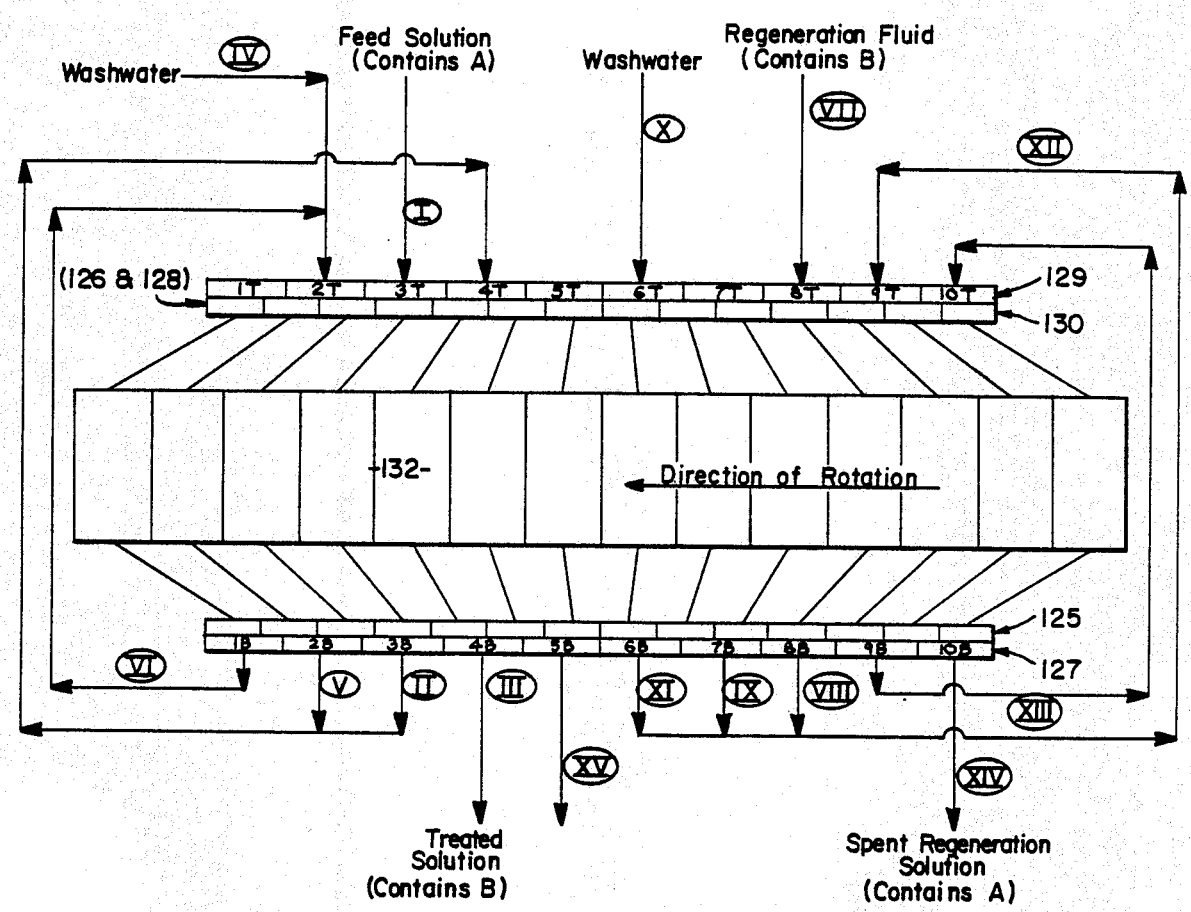
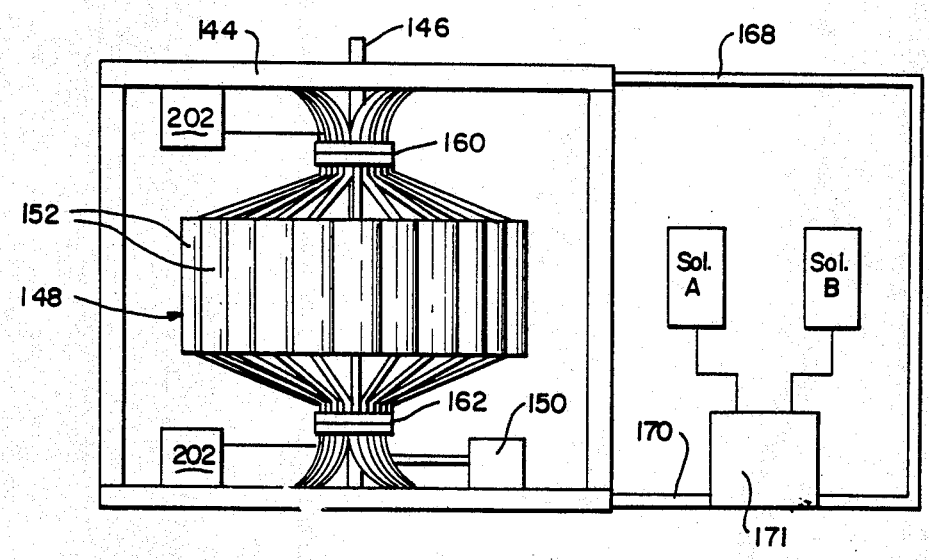

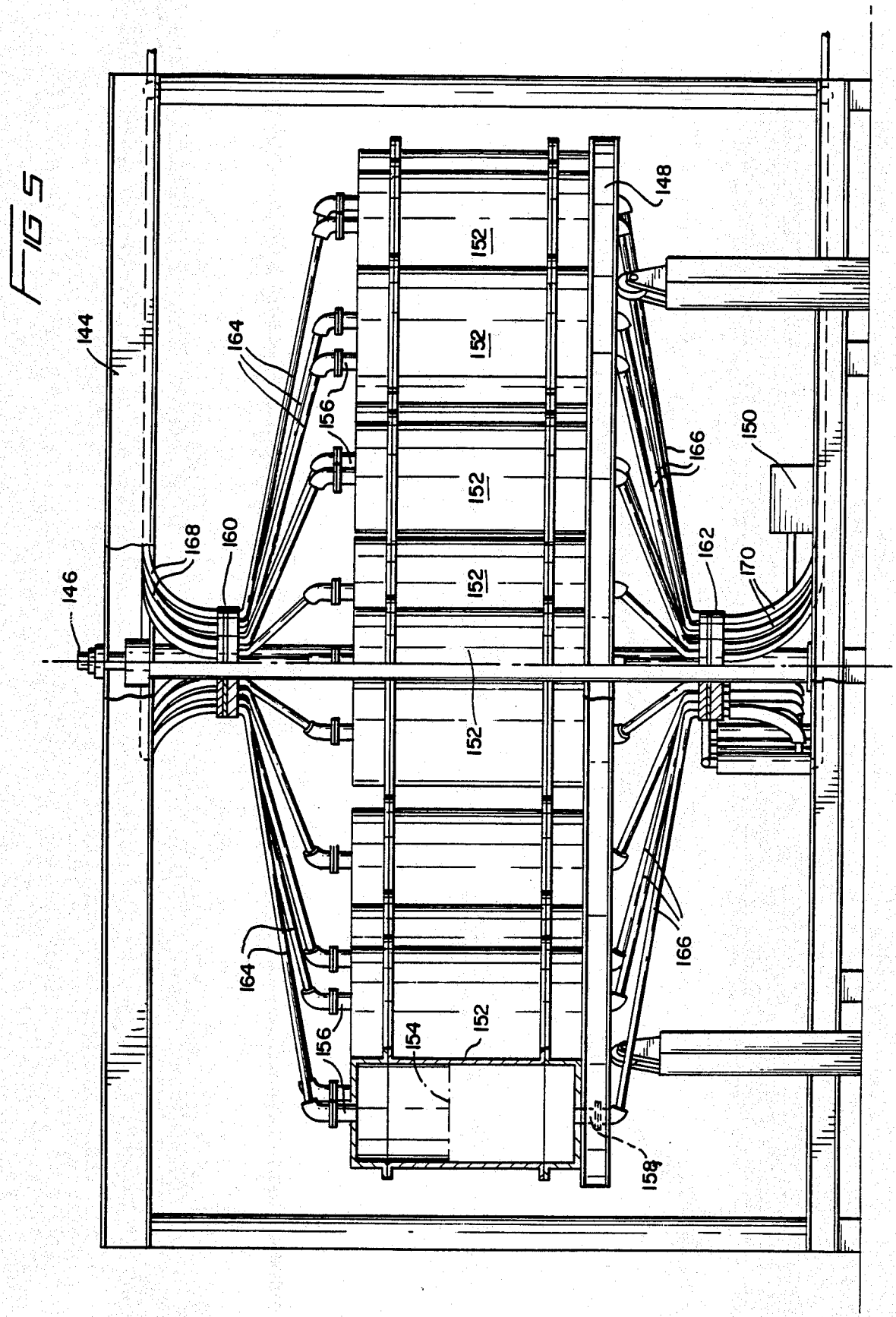

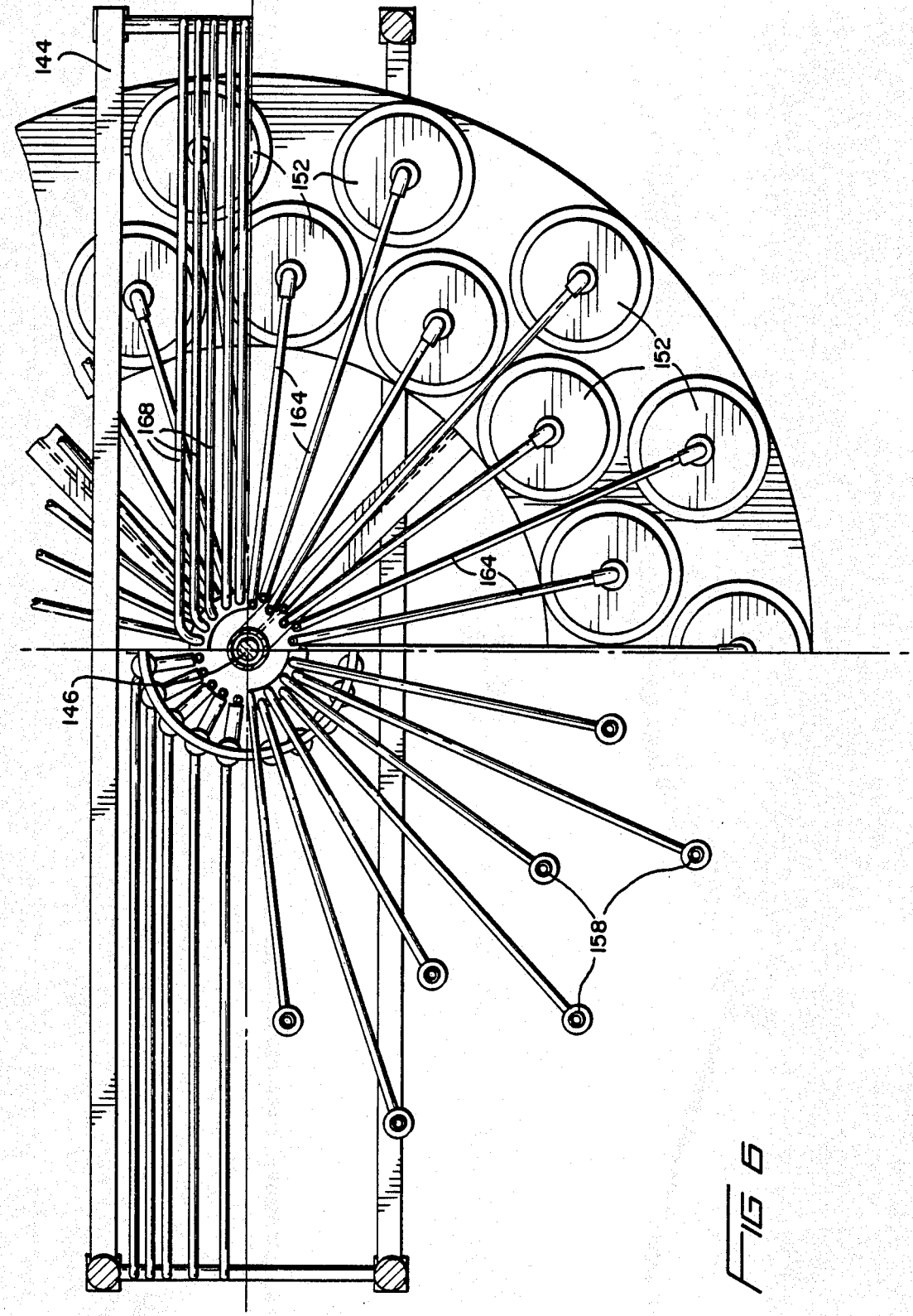

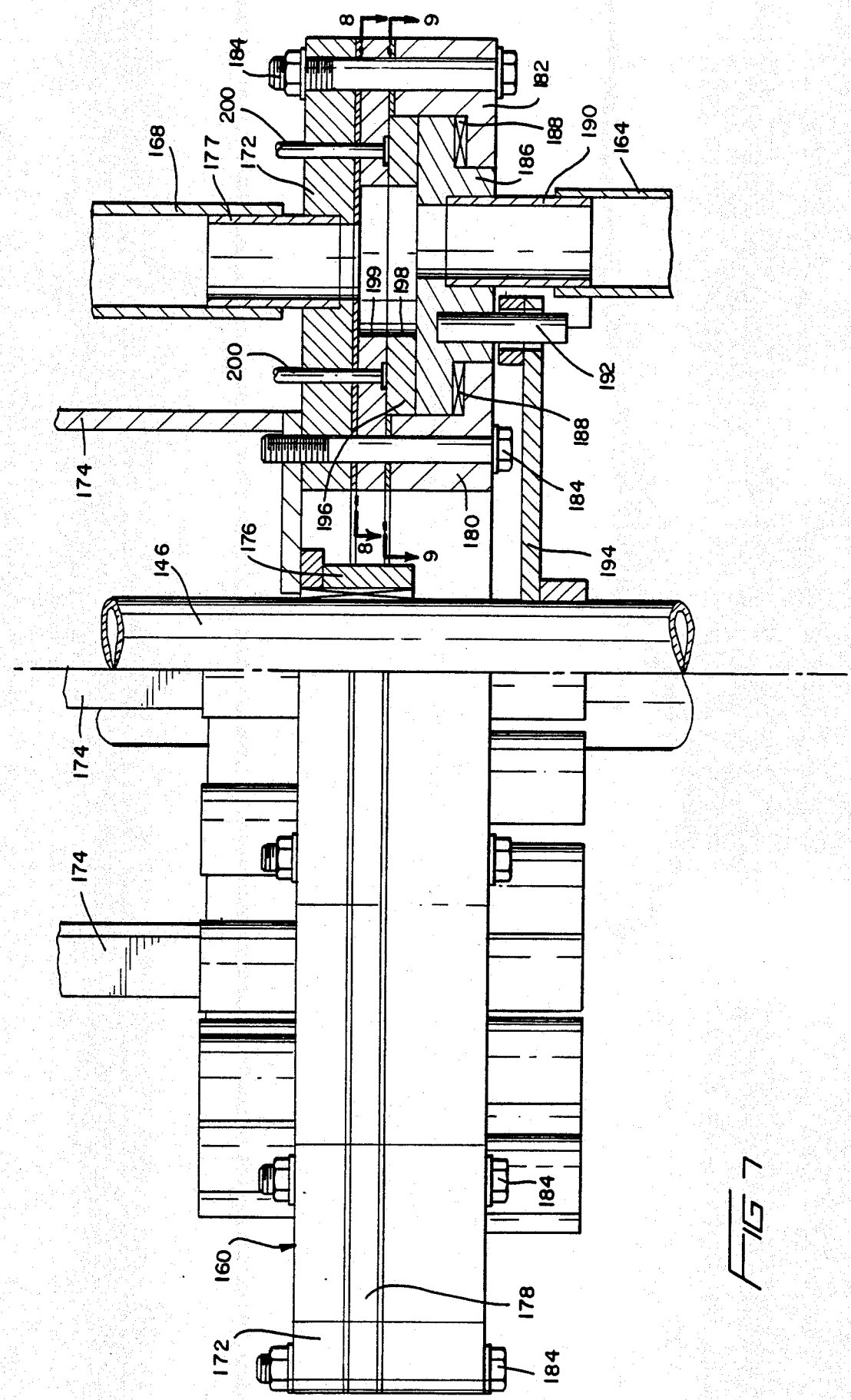

PROCESS FOR CONTINUOUS CONTACTING OF FLUIDS AND SOLIDS

CROSS REFERENCE TO RELATED APPLICATION

This application is a division of application Ser. No. 713,492, filed Mar. 19, 1985, U.S. Pat. No. 4,764,276 which is a continuation-in-part of application Ser. No. 635,837 filed July 30, 1984, U.S. Pat. No. 4,522,726.

FIELD OF THE INVENTION

This invention relates to liquid-solid contacting apparatus and to methods for performing physical and chemical processes by liquid-solid contacting operations.

BACKGROUND OF THE INVENTION

Ion exchange and similar devices, almost without exception, operate with fixed or semi-continuous beds. The standard design for a fixed-bed is a vertical cylindrical tank equipped with a resin support-liquid collection system at the bottom and a distribution system above the resin level. The distribution and collection systems are critical design features since the liquid must be delivered uniformly over the total surface of the resin bed without downward jetting which will disturb the level of the bed whereas the liquid leaving the bottom layer of resin must be collected uniformly across the bed.

Although fixed-bed systems are the most widely used, they suffer from several significant disadvantages. One is that the ion exchange reaction occurs only in the volume of resin in the exchange zone. Thus, resin above the exchange zone is exhausted and inert whereas that below the exchange zone is not even in use. Not surprisingly therefore, the total resin inventory in a fixed-bed column is of necessity considerably larger than needed at any one time. Additionally, since the resin in the column must be periodically cleaned and regenerated, there is a considerable amount of wasted down-time. Finally, since the fluid with which the process is carried out will have progressively decreased concentrations of the ion to be exchanged with the resin as it proceeds down the column, the concentration gradient likewise decreases and the reaction becomes less efficient.

Although such fixed-bed ion exchange processes may be carried out continuously by connecting several fixed-bed columns in parallel, with regeneration being carried out in one column while the reaction proceeds in one or more addition columns, such systems have not proven themselves completely satisfactory. More specifically, a group of fixed-bed columns still suffer from many of the disadvantages inherent in a single fixed column such as the limited volume of the actual exchange zone and the presence of a much larger amount of resin than is actually required at any one time. Additionally, even through the problem of diminished concentration gradient could be alleviated to some extent by arranging two or more fixed-bed columns in series, with fresh ion exchange fluid being fed into each of those columns there is nonetheless still a greatly diminished reaction driving force within each individual column due to the aforementioned necessity of including far greater amounts of resin in the column than are needed at any given time.

Another significant disadvantage of conventional fixed-bed resin exchange systems is the difficulty of adapting such systems to more complicated ion exchange processes. More specifically, the addition of a single column to an existing group of exchange column requires the installation of relatively complex valving arrangements which can perform the proper mixing of feed materials which might consist of fresh materials from outside the system, the effluent from one or more of the columns already in the system, a mixture of fresh and recycled materials or even no feed at all. Likewise, valves must be provided at the discharge end of the column which are capable of purging the column effluent from the system, recycling it directly to one or more of the other columns, mixing it with one or more other feed or recycled streams for entry into another column, or a combination of any of the above operations. One skilled in the art will quickly come to the realization that a system comprised of ten columns, each of which has a specific feed and discharge relationship with respect to the remaining columns, will require an extremely intricate system of valves. It will also be appreciated that even a relatively minor change in any of the operating conditions in the sample 10 column process might require a significant manipulation of the valving arrangement.

Continuous (or in fact semi-continuous) contactors have been developed which solve some of the above-identified problems. In such systems, the resin and the solution pass countercurrent to one another and steady state zones can be set up as required for exhaustion, regeneration and the required intermediate rinses. The volume of resin can thereby be reduced to the sum of the working volumes plus the interconnecting resin transfer system. Even with this improved approach, however, the flows must periodically be interrupted, so truly continuous feed and discharge is not obtained, i.e., a true steady-state profile is not achieved.

Continuous contactors generally take the form of either pulsed columns or fluidized beds. In pulsed columns, resin is moved up or down through the contacting zones by periodic application of pressure or a vacuum. Solutions flow through the resins between pulses. In fluidized bed systems, the exchanges take place with non-compacted resin. The resin may fall down through a baffled column against the upflow stream or the exchange may take place in stirred compartments or troughs where the resin is forwarded mechanically against the flow of solution.

Continuous contactors offer many advantages over the fixed-bed type, one of the more significant of which is the more efficient utilization of resin. Additionally, far greater volumes of very concentrated solutions can be treated in continuous contactors than would be possible using a fixed-bed reactor. The necessity of maintaining a uniform distribution of fixed solutions into and collection of product solutions from continuous contactors is one potential major drawback of such systems. Mechanical breakage of resins as well as the need for a large number of mechanical valves are often problems when pulsed bed system are employed.

Although more efficient utilization of resin can be achieved through continuous contacting systems, a substantial degree of inefficiency nonetheless exists. More specifically, since the increments in the pulsed bed, for example, are necessarily of a finite volume, the reaction equilibrium existing in any one of those increments will not always be very favorable. Such a loss in chemical efficiency is due in part to the partial reclassification of resin which occurs during each pulse. Of course, it would be impractical to make the increments too small.

SUMMARY AND OBJECTS OF THE INVENTION

In view of the foregoing limitations and shortcomings of prior art processes and apparatus, as well as other disadvantages not specifically mentioned above, it should be apparent that there still exists a need in the art for a continuous contacting device which achieves a high degree of chemical reaction efficiency in a minimum amount of substrate.

It is therefore a primary object of this invention to fulfill that need by providing a process and apparatus for continuous contacting which simulates moving resin systems by directing stationary feed streams into a series of rotating reactors.

Another object of this invention is to provide liquid-solid contacting method and apparatus which is capable of substantially continuous operation and allows for the uninterrupted flows of all feed, drain, regeneration and washing streams without the need for complicated valving arrangements.

It is a further object of this invention to provide liquid-solid contacting method and apparatus which can be readily adapted to performing a variety of processes without extensive disassembly of the apparatus.

Yet another object of this invention is to provide a liquid-solid contacting method and apparatus wherein exposure of the solution to fresh resin is maximized and exposure to spent resin is minimized.

Another object of this invention is to provide a liquid solid contacting method and apparatus wherein fresh liquid for interaction with the column substrate may be introduced in an interstage fashion.

A further object of this invention is to provide an ion exchange or adsorption system wherein the discharge transfer reaction is maximized.

These objects are accomplished in accordance with a preferred embodiment of the invention by liquid-solid contact apparatus that includes a plurality of containers mounted for rotation about a central axis. The containers are adapted to receive solid particulate material, such as an ion exchange resin. Liquid is supplied individually to the top of these containers through conduits connected with a valve assembly above the containers. Similarly, conduits connect the lower end of each compartment with a similar valve assembly below the containers. The valve assemblies include movable plates with slots that cover and uncover inlet ports as the plate rotates with the carousel. By varying the size of the slots in the plate and the location of the slots, the flow from the supply conduits into the container and flow from the container to the exhaust conduits can be controlled in a predetermined manner. The time during which liquid flows into and out of the containers is a function of the speed of rotation of the containers about the central axis.

The method of effecting continuous treatment of plural liquid streams is similarly characterized by process steps comprising the introduction of fluid streams into and out of the individual containers in predetermined fashion made possible by the rotation of the body. Accordingly, plural streams may be treated and individual process steps may be accomplished continuously.

DESCRIPTION OF THE DRAWINGS

Preferred embodiments of the invention are illustrated and described in the accompanying drawings, in which:

FIG. 3 is a schematic view of a modified apparatus designed to carry out a hypothetical process;

FIG. 4 is a side elevational view, partially in cross-section, of a third embodiment of the apparatus of this invention;

FIG. 5 is an enlarged side elevational view partially in cross-section of the apparatus of FIG. 4;

FIG. 6 is a top plan view of the apparatus in FIG. 4;

FIG. 7 is an enlarged elevational view, partially in cross-section, of the inlet valve assembly of the apparatus of FIG. 4;

All drawings are shown for illustrative purposes only and it will be appreciated that a wide number of various configurations or modifications to this basic concept are possible and are within the general scope of this invention.

DETAILED DESCRIPTION OF PREFERRED EMBODIMENTS

Figure 1:
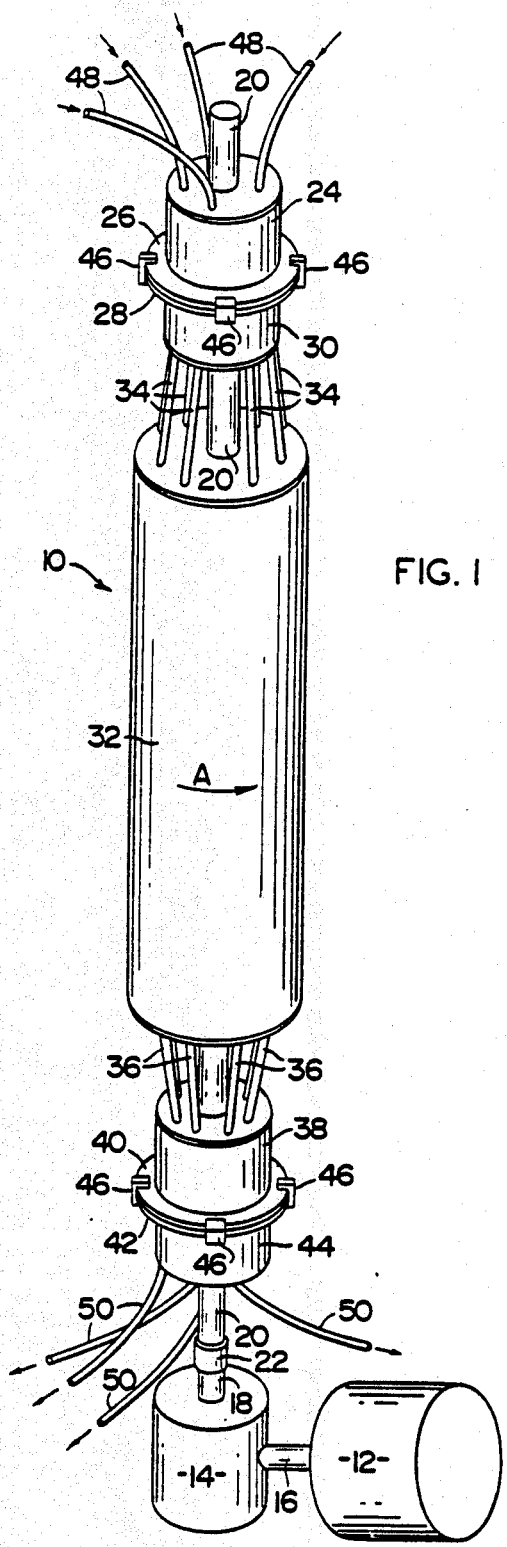
FIG. 1 is a perspective view of a first embodiment of the liquid-solid contact apparatus.
Figure 2:
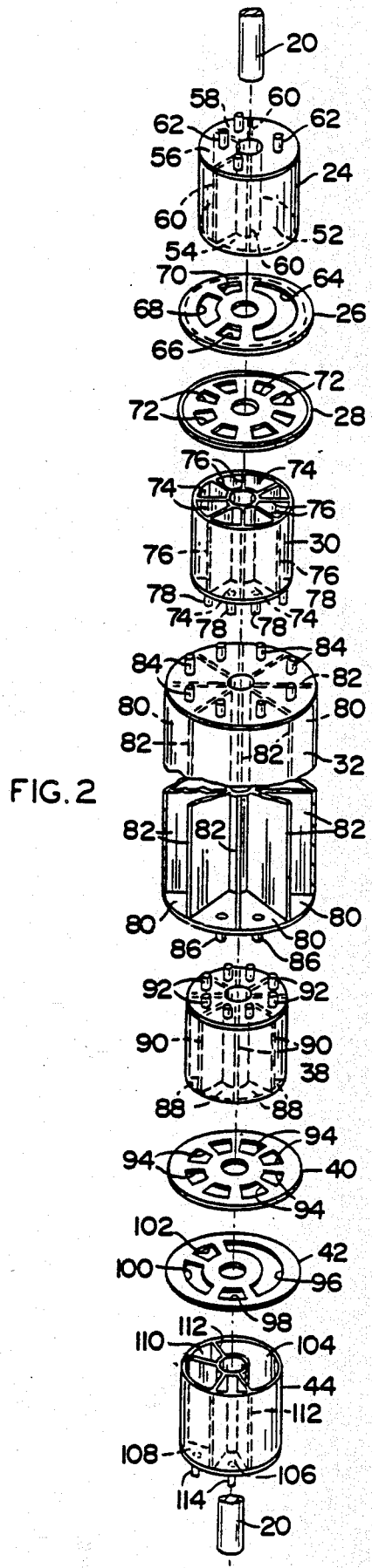
FIG. 2 is an exploded view of the apparatus shown in FIG. 1.

This invention is described in accordance with three preferred embodimetns, namely the apparatus shown in FIGS. 1 and 2, and the apparatus shown in FIGS. 4-9. A typical process in which the apparatus of the present invention may be employed is described utilizing the schematic illustration in FIG. 3.

The first embodiment of this invention is referred to herein generally as an advanced separation device, although it has broader applications. Nevertheless, for simplicity, this preferred embodiment is referred to as the advanced separation device, and is generally indicated at 10 in the perspective view of FIG. 1.

The advanced separation device 10, or at least portions thereof, are caused to rotate in the direction of arrow A by drive motor 12 and reducer 14. Motor 12 is connected to reducer 14 by shaft 16, and drive output shaft 18 extends from reducer 14. Also as shown in the representation of FIG. 1, drive output shaft 18 is connected to main drive shaft 20 by coupling means 22. It is, however, to be understood that other means may be utilized for causing rotation of device 10. For example, and not by way of limitation, one might choose to utilize circumferential drives or gear-type drives rather than the shaft-type drive illustrated in this embodiment. The scope of this invention is not to be limited by any specific construction for the drive means. Further, the direction of rotation can be either clockwise or counter-clockwise depending on specific operating requirements.

Still with reference to the view of FIG. 1, it can be seen that the advanced separation device of this invention comprises a feed box 24 having an upper timing crown 26 fixed to the downstream side thereof. An upper distribution crown 28 is movably disposed in juxtaposition downstream of the upper timing crown 26, and is fixed to the top of a distribution box 30.

Disposed downstream of distribution box 30 is separator body 32, and separator body 32 is in fluid communicating relation with distribution box 30 by virtue of the plurality of upper conduits 34. Downstream of separator body 32 are a plurality of lower conduits 36 which connect separator body 32 in fluid communicating relation to collection box 38. A lower distribution crown 40 is fixed to the downstream side of collection box 38 and is movably disposed in juxtaposition to lower timing crown 42. Fixedly attached to the downstream side of lower timing crown 42 is discharge box 44.

It can also be seen that a plurality of clamps 46 are utilized to maintain to relative positions of upper timing crown 26 to upper distribution crown 28 and of lower distribution crown 40 to lower timing crown 42. It is to be understood that other mechanical equivalents for clamps 46 might be utilized such as a solid collar arrangement, and the scope of this invention is not to be limited in this regard. All that is necessary is that clamp means 46, or their mechanical equivalents, maintain the relative position of the juxtaposed structural elements while permitting rotation of the upper distribution crown 28 and the lower distribution crown 40 as well as all structural elements interposed therebetween with respect to the remainder of device 10. It has also been found to be desirable to provide the abutting surfaces of upper timing crown 26 and upper distribution crown 28 as well as those corresponding surfaces of lower distribution crown 40 and lower timing crow 42 with means to reduce friction and wear therebetween. For example, these abutting surfaces may be coated with a polymer compound, such as polypropylene or may be provided with friction-reducing wear seals. Further, one of the plates may be constructed entirely of a polymer material while the other plate in contact with said polymer plate is constructed of a hard material, such as stainless steel or other metallic material. Of course, inasmuch as upper distribution crown 28, lower distribution crown 40, and all structural elements therebetween rotate, those elements are disposed in driven relation to main drive shaft 20 by appropriate mechanical means which are within the knowledge of a person skilled in the art. Similarly, since feed box 24, upper timing crown 26, lower timing crown 42 and discharge box 44 are stationary, they are not connected in driven relation to main drive shaft 20. Just as obviously, a support structure or frame for the advanced separation device 10 would be required, but is not illustrated for the reason that the support structure, per se, does not fall within the scope of this invention.

Finally, with particular regard to the view of FIG. 1, a plurality of inlet conduits 48 are provided at the top of feed box 24 for the purpose of introducing fluid streams into device 10 for treatment, and a corresponding plurality of outlet conduits 50 are provided at the bottom of discharge box 44 for removing treated fluid strems. While device 10 is illustrated as comprising four inlet conduits 48 and four outlet conduits 50, as will be set forth in greater detail below, the scope of this invention is not to be limited to precisely four inlet streams and four outlet streams, and indeed it will be apparent that a large number of inlet streams, discharge streams and the like can be incorporated into versions of this basic invention. Having thus set forth preferred general construction for the advanced separation device 10, attention is now invited to the exploded view of FIG. 2 for a further detailed description of the individual structural elements.

Feed box 24 is of generally cylindrical configuration the interior of which defines four feed box sections 52, 54, 56 and 58. These feed box sections 52–58 are each defined by the walls of feed box 24 and feed box partitions 60. An inlet nipple 62 is in fluid communicating relation to each of the feed box sections, and the bottom of each feed box section is open. The inlet conduits 48 shown in the view of FIG. 1 are connected, respectively, to a corresponding one of the inlet nipples 62.

Fixed to the bottom of feed box 24 is upper timing crown 26. As clearly seen in the vie of FIG. 2, upper timing crown 26 comprises a plurality of feed slots 64, 66, 68 and 70 formed therethrough in corresponding fluid communicating relation to feed box sections 52, 54, 56 and 58, respectively.

Movably disposed downstream of the upper timing crown 26 is upper distribution crown 28. As depicted in this preferred embodiment, upper distribution crown 28 comprises a plurality of upper distribution slots 72 formed therethrough. Because upper distribution crown 28 is fixed to main drive shaft 20 for rotation, it can be seen that at least one of the upper distribution slots 72 will be disposable into fluid communicating relation with at least one of the feed slots 64, 66, 68 and 70. The distribution box 30 is fixed to the downstream side of upper distribution crown 28 and defines a plurality of distribution compartments 74 each one of which is in fluid communicating relation to a corresponding upper distribution slots 72. In a fashion similar to that for the construction of feed box 24, the distribution compartments 74 are defined by distribution box partitions 76. Extending from the downstream side of distribution box 30, and in fluid communicating relation with each of the distribution compartments 74 is an outlet nipple 78. Again it is to be understood that other convenient methods can be utilized to collect fluid from the distribution slots, 72, and direct it to the next portion of the device.

The separator body 32 is also of generally cylindrical configuration and defines a plurality of working compartments 80, each one of which corresponds to one of the distribution compartments 74. The working compartments 80 are defined, in part, by separator body partitions 82. A plurality of receiving nipples 84 are provided at the top of separator body 32 such that each one of the receiving nipples 84 is in fluid communicating relation to a corresponding one of the working compartments 80. Corresponding discharge nipples 86 are provided at the bottom of separator body 32. At this point it should be noted that upper conduits 34 are operatively disposed between corresponding pairs of receiving nipples 84 and outlet nipples 78 so as to permit the transfer of fluid from distribution box 30 to separator body 32. While the separator body 32 is shown as a cylindrical vessel containing a number of partitions 82, it is to be understood that individual cylindrical tubes can be used in place of each partitioned section or that individual, formed chambers, of a general triangular shape, can be used in the separator zone.

Disposed downstream of separator body 32 is the collection box 38, the construction of which is a substantial mirror image of distribution box 30. Accordingly, collection box 38 defines a plurality of collection compartments 88 therein, each one of which is at least partially defined by collection box partitions 90. A plurality of collection nipples 92 are provided at the top of collection box 38 such that each one of the nipples 92 is in fluid communicating relation to a corresponding one of the collection compartments 88. Referring to the view of FIG. 1, discharge nipples 86 are connected in fluid communicating relation to a corresponding one of the collection nipples 92 by lower conduits 36.

Just as the collection box 38 is a substantial mirror image of the distribution box 30, so are the lower distribution crown 40, the lower timing crown 42 and the discharge box 44 substantial mirror images of the upper distribution crown 28, the upper timing crown 26 and the feed box 24, respectively. The lower distribution crown 40 is fixed to the downstream end of collection box 38 and comprises a plurality of lower distribution slots 94 formed therethrough, each one of said plurality of lower distribution slots 94 being in fluid communicating relation to a corresponding one of the collection compartments 88. The lower timing crown 42 similarly comprises lower discharge slots 96, 98, 100 and 102 formed therethrough whereby at least one of said discharge slots 96, 98, 100 and 102 is disposable into fluid communicating relation with at least one of said lower distribution slots 94.

The discharge box 44 is fixed to the downstream side of lower timing crown 42 and is defined by a plurality of discharge sections 104, 106, 108 and 110 defined by the walls of discharge box 44 and discharge box partitions 112. Finally, each of the discharge sections 104, 106, 108 and 110 is provided with a discharge nipple 114 from which treated fluid may be withdrawn as through outlet conduits 50 shown in the view of FIG. 1.

Sealing arrangements between the upper timing crown 26 and the upper distribution crown 28 as well as between the lower distribution crown 40 and the lower timing crown 42 may consist of O rings and/or strips of carbon, polypropylene or other such material, depending upon the nature of the fluids being processed. Working compartments 80 of the separator body 32 are filled with ion exchange resin, or other suitable media to effect the desired separation or filtration. Porous plate, filter cloth or screen would normally be placed in the top and bottom of each working compartments 80 to prevent overflow of the separator media. Other material such as, for example, glass beads may be used as further support for the resin.

The effect of the rotation of those elements of the device 10 defined at each end by upper distribution crown 28 and lower distribution crown 40 is to distribute the input solutions, slurries or gases, in turn, to the various working compartments 80 of separator body 32. The rotational speed of device 10 will be determined by the nature of the process fluids, the separation media contained within separator body 32, and the pressure drop through the device. The use of higher levels of pressurization will speed fluid flow and permit device 10 to be rotated at an increased speed relative to low or ambient pressurization. It is contemplated that the advanced separation device 10 will normally rotate in the range of 1 to 30 rotations per hour; however, wider ranges of rotational speed are possible depending upon process conditions. Thus, it can clearly be seen that the advanced separation device 10 of this invention provides a truly continuous separation operation since all process fluids, as well as purging fluids, may be fed and extracted continuously.

The apparatus of FIG. 1 permits a variety of processes to be performed by varying the external connections between the inlet conduits 48 and the outlet conduits 50, and by providing the appropriate upper timing crown 26 and upper distribution crown 28 and lower distribution crown 40 and lower timing crown 42. As indicated above, the number of compartments in the body 32 can be increased or decreased according to the particular process requirements. In FIG. 3, a hypothetical process system concept is presented in order to explain the novel concept of this invention. The apparatus illustrated in FIG. 3 includes ten fixed feed ports, and fourteen ion exchange containing compartments. When visualizing the ASD system concept, it is helpful to ignore individual compartments which rotate and view of the separator body as an infinite source of ion exchange resin. From a process standpoint the analysis is based on the fixed feed and discharge ports. By focusing attention on the fixed ports, and recognizing that the moving resin chambers provide this infinite source of new adsorbant, conceptualization of the process is simplified.

Referring to FIG. 3, a feed solution I which contains compound "A" is fed to the feed box at position "3T" (top). For this example the objective is to remove "A" from the feed solution and replace it with "B".

The feed solution passes through the feed box and into the distribution box via the timing and distribution crown interface (26 & 28). Solution passes through resin in the separator body, which is receiving fluid from feed point "3T". An exchange of compound "A" for compound "B" which was previously loaded on the resin occurs. In order to simply illustrate the versatility of the process, a counter-current approach is utilized. Solutions leaving this contacting stage exit through port 3B (bottom) as stream number 2. In order to maximize the driving force in such systems a counter-current approach can be utilized. Stream 2 can be fed forward to position "4T" where it would contact incoming fresh, or regenerated resin. It should be apparent that such a contacting approach can be utilized to enhance any thermodynamic advantages which ion exchange may offer over other processes.

Solution passes from position "4T" through the separator body and exits as treated solution, stream 3, from position "4B". This treated solution now contains compound "B" and very little compound "A", which is not on the resin.

In typical systems, feed solution would be conserved by means of a water wash. Stream 4 can be utilized to "push out" any residual feed solution, which is entrained in the resin as it rotates under the feed box system. The wash water can typically be added to the counter-current stream via 5 or the wash water could be treated separately.

As the separator body continues to rotate and the resin chamber in question is under position "1", wash water is allowed to drain and is returned to the wash water system (stream 6).

The separator body continues to rotate and a given mass of resin enters the regeneration system. Here it is contacted with regeneration fluid, stream 7, which contains compounds "B". This compound will be utilized to replace compound "A" on the resin, thus completing the ion exchange process. Stream 7 enters through position "8T" and passes in a counter-current fashion through the spent resin. The three shapes of countercurrent contacting, shown for illustrative purposes only, indicate the high level of versatility achievable with the ASD system. Again, a washing stream (stream 10) is utilized to recover any regeneration fluid.

In this example, the discharge from the primary regeneration fluid feed section, stream 8, along with drainage and wash water, streams 9 & 11, are combined and fed forward, in a counter-current fashion, as stream 12 which enters position "9T". Fluid from this contacting step exiting port 9B is again fed forward to position "10T" as stream 13. This final contact ensures maximum driving force so that the spent regeneration fluid, stream 14, contains very little compound "B".

Since the separator body is composed of discreet chambers of ion exchange resin, and since all flows are truly continuous, substantially all of the resin is executing some process function at all times, i.e., there is very little "unused" resin. The resin is either being washed, regenerated, loaded, drained, etc. Hence, total resin requirements for an ASD system are substantially less than those required for equivalent pulse bed or fixed bed circuits.

It will be appreciated by those skilled in the art that the above-described process concept shown is presented for illustrative purposes only. Extremely complex process arrangements can be envisioned with the ASD system and accomplished in a very straight forward manner. A significant aspect of the ASD type process approach is therefore that the degree of complexity of the system is no longer a restraining factor relative to an ion exchange process. Since the basic process operation is continuous, increasing process complexity is merely a matter of adding pumps and some additional piping.

This is radically different than the approach which would be taken with fixed or pulse bed systems. In these systems, as the process becomes more complex the equipment system increases in complexity as well and indeed, the increase in equipment complexity is not linear. Thus, in conventional fixed or pulse bed systems doubling the process complexity will more than double the actual equipment system complexity. Such is not the case with the ASD circuit.

A second preferred embodiment of the invention is shown in FIGS. 4-9. As shown in FIGS. 4, 5, and 6, the apparatus includes a rectangular frame 144 which supports a vertical drive shaft 146. A carousel 148 is mounted for rotation on the drive shaft. The carousel is fixed to the shaft and the shaft is driven by a motor 150 mounted on the frame 144. A plurality of cylindrical containers 152 are mounted vertically on the carousel 148. As shown in FIG. 6, the containers are arranged in staggered relation around the circumference of the carousel, and in this embodiment, there are thirty containers. It should be noted that, in addition to cylindrical chambers, other geometric shapes, e.g., triangular, trapezoidal, etc. can be used to hold the sorbent, depending on size considerations, etc. Each of the containers is filed with resin or other suitable solid material according to the particular process being performed. As shown at the left side of FIG. 5 in cross-section, the solid material 154 is filled to about one-half the height of the container. An arrangement is provided on each container for inserting and removing the solid material through the top of the container. Pipe fittings 156 and 158 are provided on the top and bottom, respectively, of each container 152. An upper valve body 160 and a lower valve body 162 are mounted over the drive shaft 146. Individual conduits 164 and 166 connect the valve bodies 160 and 162 with the respective upper and lower pipe fittings 156 and 158. Supply conduits 168 are mounted in the top of the frame 144 and extend upwardly from the valve body 160. Similarly, discharge conduits 170 extend downwardly from the lower valve body 162 to the frame 144.

As shown in FIG. 4, the conduits 168 and 170 are interconnected in a conventional manner to provide the desired sequence of flow. Pumps indicated at 171 in FIG. 4 are provided. These pumps correspond to the pumps 125 shown in FIG. 3. The solution to be treated, designated solution A is supplied from a source shown schematically in FIG. 4 and the solution for regenerating the treatment material, designated solution B is supplied from a source shown schematically in FIG. 4. Suitable control valves, not shown, may be provided as necessary.

Figure 8:
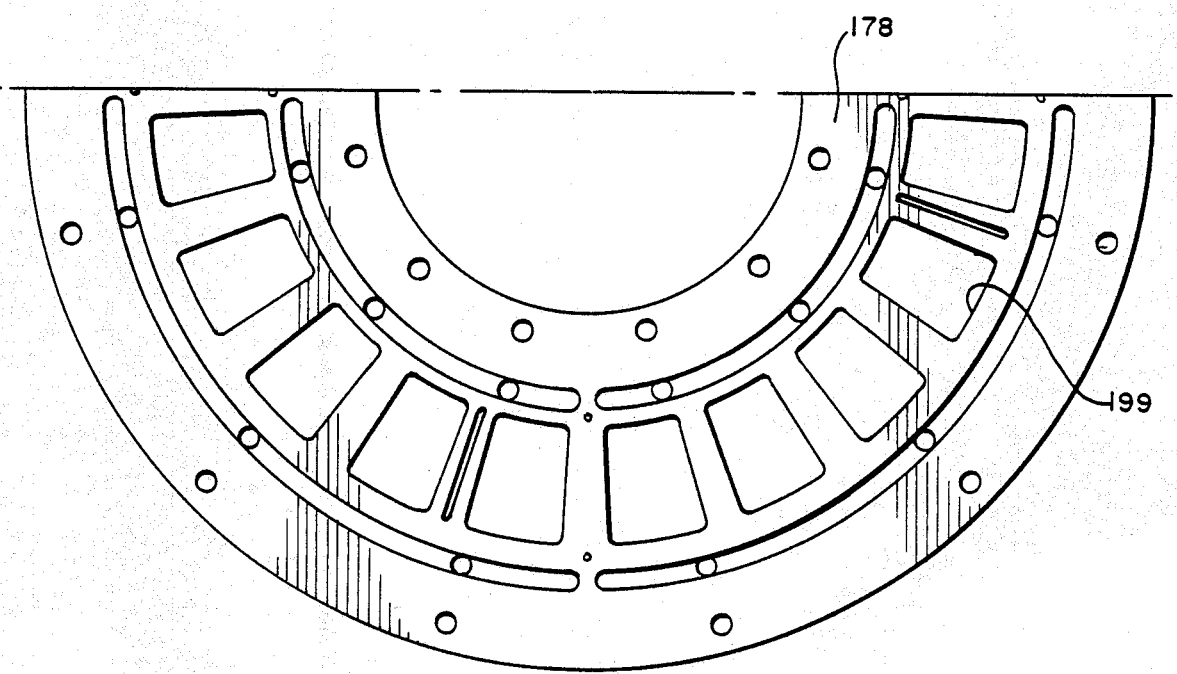
FIG. 8 is a top view of the apparatus of FIG. 4 along the line 8—8 in FIG. 7.

Referring to FIG. 7, the upper valve body 160 includes a stationary head 172 which is in the form of a flat ring that is concentric with the shaft 146. The head 172 is supported on mounting brackets 174 that extend downwardly from the frame 144 and by a bearing 176 that engages the shaft 146. Pipe fittings 177 are mounted at equally spaced locations around the circumference of the head 172. A removable wear plate 178 corresponding to the upper timing crown 26 of FIG. 2 and preferably, formed of an appropriate plastic material, such as polypropylene, is secured below the stationary head 172. As shown in FIG. 8, the wear plate has openings 199 which are aligned with the pipe fittings 177 in the stationary head 172. An inner retainer flange 180 and an outer retainer flange 182 are secured to the stationary head by bolts 184.

A rotary head 186, corresponding to the upper distribution box 28 of FIG. 2, is supported between the retainer rings 182 by roller bearings 188. The rotary head includes a pipe fitting 190 to which is secured a conduit 164 which conveys liquid to one of the container 152. Rotation is imparted to the rotary head 186 by means of a drive pin 192 which connects the rotary head with a drive plate 194 that is secured on the drive shaft 146 and turns with the shaft. Interposed between the rotary head 186 and the plate 178 is a valve seal plate 196. The plate 196 is secured to the rotary head 186 so that it turns with the head. The valve plate 196 is provided with openings 198 which are arranged in a pattern as required to supply liquid from the stationary supply conduit 168 to the containers 152 through the valve plate according to the particular process being performed.

Figure 9:
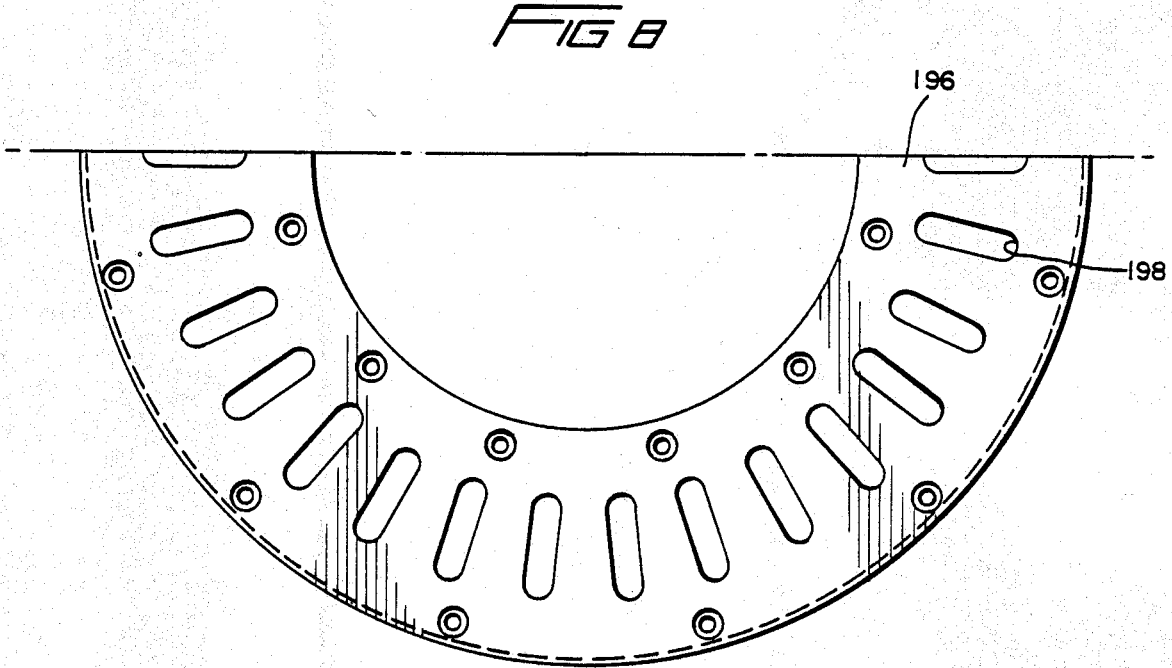
FIG. 9 is a top view of the valve assembly of the apparatus of FIG. 4 along the line 9—9 in FIG. 7.

A typical pattern for the wear plate 178 and the valve seal plate 196 are illustrated respectively in FIGS. 8 and 9. It will be appreciated that the wear plate 17, which remains stationary during the process, has twenty identical openings or windows 198 each of which corresponds to one of the fixed supply conduits 168 shown in FIG. 6. Of course, a greater or lesser number of windows may be provided depending on the particular requirements of the process being carried out. It is also possible that there would be no fluid supplied to one or more of the windows 198 when it is desired that the resin-filled chambers be allowed to drain during part of the cycle.

The rotating valve seal plate 196 illustrated at FIG. 9 is provided with thirty slots 190, each of which corresponds to a particular resin-filled chamber 152. Since there are only twenty windows 198 through which feed materials may be supplied, it is obvious that fluid flow through each window will be uninterrupted, i.e. there will always be the equivalent of 1 or more slots (hence chambers) under the window at any given time. Additionally, as is evident from the relative configurations of the slots 190 and the windows 198, each slot will be in fluid communicating relation with the windows for two time increments followed by one time increment in which it is out of fluid communication relation. This pattern repeats throughout the operation of the ASD device so long as the rotational speed of the valve seal plate 196 remains constant.

Of course, there need not be so many chambers out of fluid communicating relation with the supply conduits at any one time. Thus, in the A/B ion exchange process previously described and illustrated at FIG. 3, ten of the fourteen resin filled chambers 32 are active at any one time since ten feed boxes 1T–10T are provided.

It is further obvious that the relative size of the windows does not have to be constant and the individual windows can vary in size depending on the process requirements. Size and number of windows, slots and chambers will, of course, depend on the specific process. Additionally, the rate of fluid flow to each of the windows may be varied. Such simulates columns to varying diameters.

To prevent leakage of liquid between the stationary head 172 and the wear plate, a suitable gasket material is provided. Similarly, a gasket is provided between the retainer flanges 180, 182 and the stationary wear plate 178. A suitable sealing arrangement may also be provided between the rotary valve plate 196 and the wear plate 178. In addition to conventional seals, or instead of conventional seals, vacuum ports 200 are provided in the stationary head 172. These ports communicate with a source of vacuum 202 (FIG. 4), to draw off any liquid that may tend to leak into the joint between the rotary valve plate and the stationary wear plate.

The lower distribution valve assembly 162 has the same structure as the upper valve assembly 160, as described above, except that the lower valve assembly 162 is turned upside down from that illustrated in FIG. 6, and has the stationary head located below the rotary head. In all other respects, the lower valve assembly has the same structure as the valve assembly shown in FIG. 6. Typically, however, the relative angular position of the bottom valve assembly will be slightly off-set from the upper assembly to account for the rotation of the resin chambers, and the slight hold-up of liquid in said chambers.

In operation, the apparatus of FIGS. 4–8 has the respective supply pips 168 connected with appropriate sources of wash solutions and reagent solutions according to the particular process to be performed. The discharge conduits 170 are similarly connected with drains or recycle paths according to the requirements of the process. The motor 150 is actuated to cause the carousel 148 to rotate.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A process for continuously contacting fluids with solid particular material comprising the steps of:
   (a) placing solid particular material into a plurality of chambers;
   (b) continuously advancing said plurality of chambers simultaneously along a continuous path at a uniform rate, said chambers having individual inlet ports and outlet ports;
   (c) positioning stationary supply ports to cooperate with said inlet ports and positioning stationary discharge ports to cooperate with said outlet ports;
   (d) supplying a treatment fluid to each chamber in sequence while the chamber advances along said path, the fluid being conducted individually to the chambers through a supply port and an inlet port;
   (e) collecting the treatment fluid from each chamber in sequence while the chamber advances along said path, the fluid being conducted individually from the chambers through an outlet port and a discharge port;
   (f) supplying a regenerating fluid to each chamber in sequence while the chamber advances along said path, the fluid being conducted individually to the chambers through a supply port and an inlet port;
   (g) collecting the regenerating fluid from each chamber in sequence while the chamber advances along said path, the fluid being conducted individually from the chambers through an outlet port and a discharge port; and
   (h) conducting treatment fluid from the discharge port of one chamber to the supply port of the next preceding chamber, said fluid being conducted through said inlet port and said chamber and said outlet port to said discharge port.

2. The process of claim 1 wherein a wash fluid is supplied to said chambers in sequence between said regenerating fluid collecting step and said treatment fluid supplying step.

3. The process of claim 1 wherein said particular material is ion exchange resin.

4. The process of claim 1 wherein said path is circular.

5. The process of claim 1 wherein at least two of said fluids are supplied to separate ones of said chambers at different rates with respect to each other.

6. A process for continuously contacting liquids with solid particular material comprising the steps of:
   (a) mounting a plurality of chambers on a common support and rotating the support about a vertical central axis at a uniform rate;
   (b) placing solid particular material in said chambers, said chambers having individual inlet ports and outlet ports;
   (c) positioning stationary supply ports to cooperate with said inlet ports and positioning stationary discharge ports to cooperate with said outlet ports;
   (d) supplying a treatment liquid to each chamber in sequence while the chamber advances along said path, the liquid being conducted individually to the chambers through a supply port and an inlet port;
   (e) collecting the treatment liquid from each chamber in sequence while the chamber advances along said path, the liquid being conducted individually from the chambers through an outlet port and a discharge port;
   (f) supplying a regenerating liquid to each chamber in sequence while the chamber advances along said path, the liquid being conducted individually to the chambers through a supply port and an inlet port;
   (g) collecting the regenerating liquid from each chamber in sequence while the chamber advances along said path, the liquid being conducted individually from the chambers through an outlet port and a discharge port;
   (h) conducting treatment liquid from the discharge port of one chamber to the support port of the next preceding chamber, said liquid being conducted through said inlet port and said chamber and said outlet port to said discharge port.

7. The process according to claim 6 wherein said liquids flow by gravity through said chambers.

8. The process according to claim 6 wherein said particulate material is ion exchange resin.

9. The process according to claim 6 including supplying a wash liquid to said chambers in sequence between said regenerating liquid collecting step and said treatment liquid supplying step.

* * * * *